Jan. 12, 1965  R. P. DUMM  3,165,292
REMOVABLE NIPPLE MOUNTING FOR A BALL VALVE
Filed June 26, 1961  2 Sheets-Sheet 1

INVENTOR.
ROBERT P. DUMM,
BY
ATTORNEY.

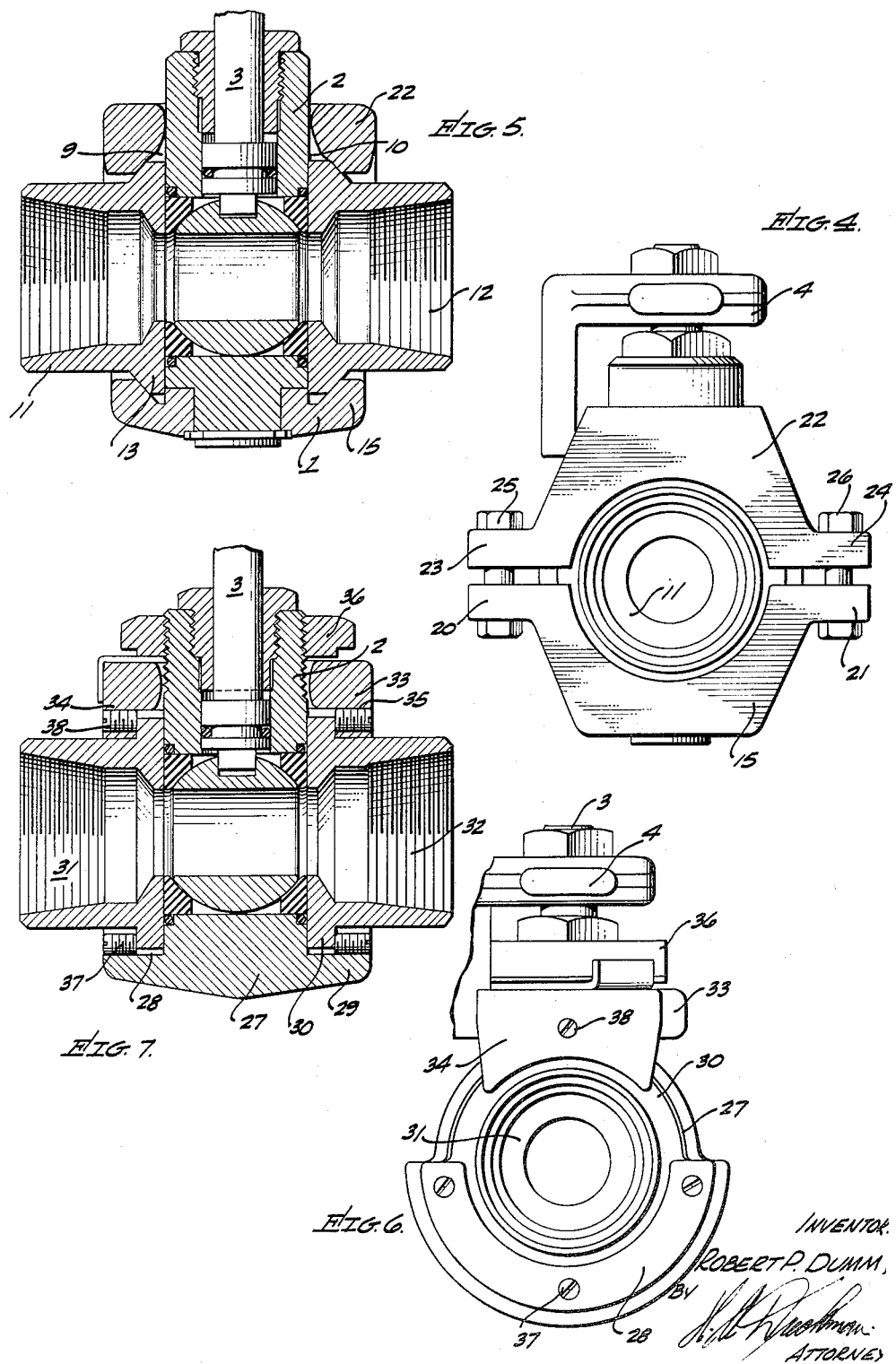

United States Patent Office 3,165,292
Patented Jan. 12, 1965

3,165,292
REMOVABLE NIPPLE MOUNTING FOR
A BALL VALVE
Robert P. Dumm, Long Beach, Calif., assignor to Pacific Valves, Inc., Long Beach, Calif., a corporation of California
Filed June 26, 1961, Ser. No. 119,498
3 Claims. (Cl. 251—148)

This invention relates to a nipple mounting for a valve, such as a ball valve, and particularly relates to a means of removably securing the nipple to the body of the valve, so that the nipple can be attached to the valve body after it is threaded or otherwise secured to the pipe in which the valve is mounted.

An object of my invention is to provide a novel nipple mounting for a valve in which the nipple can be attached to a pipe before the valve is mounted, thus eliminating the use of a union in the pipe line.

Another object of my invention is to provide a novel nipple mounting for a valve in which the valve body can be arranged at any desired angle with relation to the pipe line, so that the valve can be accommodated to a required position, and to permit the valve to be angularly arranged to avoid adjacent objects.

Another object is to provide a nipple mounting for valves in which the nipple is tightly held against the body of the valve, and is sealed by pressure of the mounting structure.

Still another object of my invention is to provide a novel nipple mounting of the character stated, in which the nipple is securely and immovably held in an arcuate seat in the body of the valve by means of one of the mounting elements.

A feature of my invention is to provide a novel means of holding the nipple against a face of the valve body to seal the nipple against the body to prevent leakage.

Other objects, advantages and features of invention may appear from the accompanying drawings, the subjoined detailed description and the appended claims.

In the drawing

FIGURE 4 is an end view of a modified form of nipple mounting.

FIGURE 5 is a vertical sectional view of the modification shown in FIGURE 4.

FIGURE 6 is an end view of still another modified form of nipple mounting.

FIGURE 7 is a vertical sectional view of the modification shown in FIGURE 6.

Figure 1:
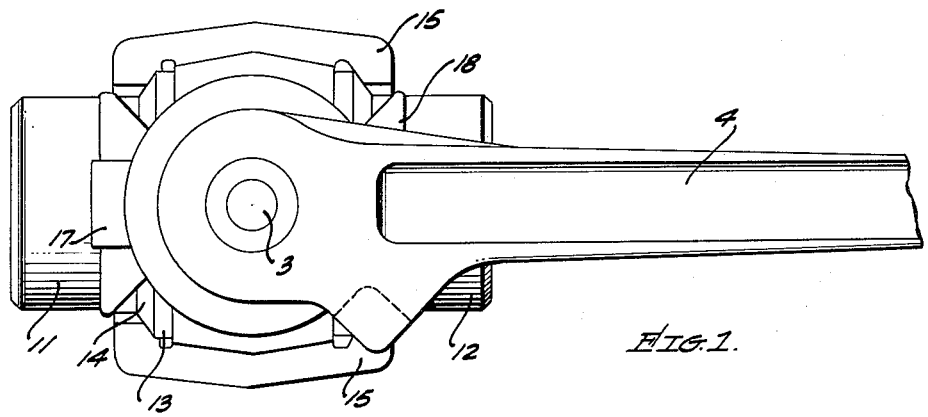
FIGURE 1 is a top plan view of my nipple mounting on a valve.
Figure 2:
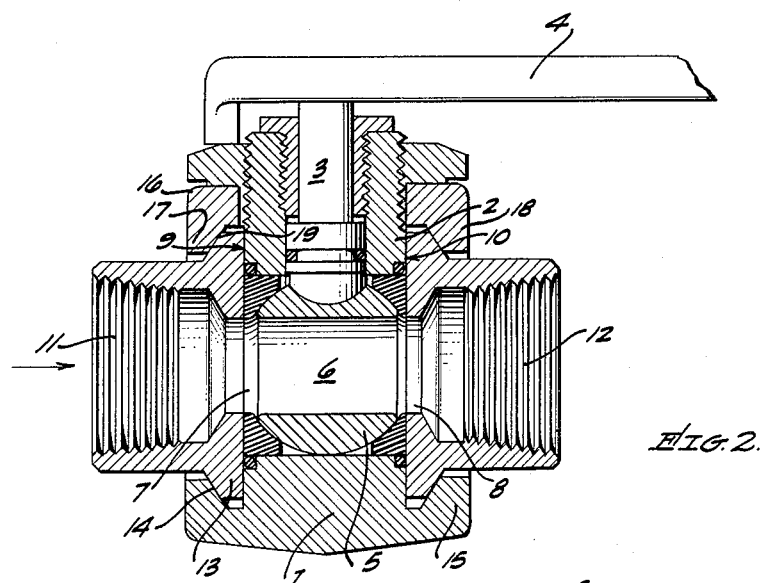
FIGURE 2 is a vertical sectional view of the same.
Figure 3:
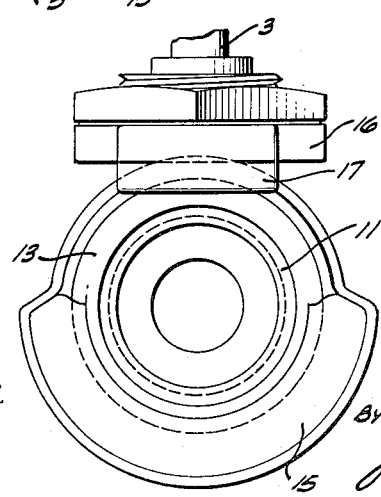
FIGURE 3 is an end view of the same.

Referring more particularly to the drawing, the numeral 1 indicates the body of a valve, which body includes a bonnet 2 through which the valve control stem 3 extends. A handle or wheel 4 is attached to the stem 3, for the purpose of rotating that stem to move the ball 5 into open or closed position. The stem 3 is attached to the ball 5 with a detachable tongue and groove structure usual and well known in the art. The ball 5 of the valve includes a transverse passage 6 through which fluid passes, and this passage is alignable with the intake port 7 and the outlet port 8 in the valve body 1. The side faces 9 and 10 of the valve body 1 are flat finished faces, for a purpose to be subsequently described. These surfaces are adjacent to the ports 7 and 8 respectively, and are engaged by respective nipples, as will be subsequently described. Seat rings 5ᵃ and 5ᵇ are mounted in the body 1 of the valve and are engaged by the ball 5 in the usual and well known manner.

In order that a valve may be mounted in a pipe line, suitable nipples of proper design, such as the nipples 11 and 12, are provided. In the instant case these nipples are internally threaded to receive the threaded ends of pipe, although other means of attaching the nipples to a pipe may be provided if desired. The nipples 11 and 12 are separate and distinct parts of a valve assembly and can be individually mounted on a pipe before the valve itself is positioned in the pipe line, that is, the nipples 11 and 12 can be threaded onto the pipe at the point desired. The nipples 11 and 12 are each provided with an annular flange 13, which is flat on its innermost face to fit against the surfaces 9 or 10 of the valve body 1. The outer face of the flange 13 is tapered, as shown at 14, for a purpose to be further described.

The valve body 1 is formed with an arcuate seat 15 at its lowermost end, and this seat is about 180° in length. The inner edge or face of the seat 15 is also tapered to receive the tapered surface 14 of the flange 13. It will be evident that the nipples 11 and 12 can assume any rotative position in the seats 15 that might be required.

To hold the nipples 11 and 12 in their required positions on the body 1 of the valve, and also to press them tightly against the faces 9 and 10 respectively, I provide a cap 16 which fits around the bonnet 2 with a sliding fit. The cap 16 is provided with two depending fingers 17 and 18 which engage the upper portion of the flanges 13 of the nipples 11–12 respectively. The fingers 17–18 are tapered, as shown at 19, to fit the coacting surface of the flanges 13; thus when the cap 16 is forced downwardly, the nipples 11 and 12 will be tightly pressed into their respective seats 15, and also will be pressed tightly against the flat surfaces 9 and 10 of the body 1 of the valve. To hold the cap 16 securely in position, and also to wedge that cap against the flanges 13 of the nipples, I provide a nut 19 which screws onto the bonnet 2 of the valve body 1, and bears against the top of the cap 16, thus pressing the cap tightly against the flanges 13 of the nipples 11 and 12, thus holding both of these nipples tightly and immovably in position on the body 1 of the valve.

In the modification shown in FIGURES 4 and 5 the construction of the nipples 11 and 12 is identical to that previously described. The body 1 of the valve is formed with the same arcuate seats 15 as previously described, but with the addition of outwardly projecting flanges 20 and 21 on opposite sides of the seat 15. The nipples 11 and 12 are each formed with an outwardly projecting flange 13, as previously described, and this flange fits into the arcuate seat 15 in the same manner as previously described. To hold the nipples 11 and 12 securely in their respective seats 15, I may provide an arcuate cap 22 which fits over the upper half of each of the nipples 11 and 12. The arcuate caps 22 are each formed with outwardly projecting flanges 23 and 24 which cooperate with the flanges 20 and 21 respectively, so that the bolts 25 and 26 can extend through these flanges as shown in FIGURE 4, thus tightening the cap 22 against the nipples 11 or 12 to draw these nipples tightly against the side faces 9 and 10 of the valve body. Before the cap 22 is tightened onto the seat 15, the nipples 11 and 12 may be adjusted to any rotative position required, since the flanges 13 of the nipples are annular and can assume any circular position.

In FIGURES 6 and 7 I have shown still another modification of a means of detachably mounting the nipples 11 and 12 in a valve body. In this modification the valve body 27 is formed with arcuate seats 28 on each side thereof, and these seats are similar to the arcuate seats 15 previously described. In this instance, however, the seats 28 are not tapered on their inner surfaces, but have a square recess 29 into which the circular flange 30 of the nipples 31 and 32 extends. The cap 33 which holds the nipples 31 and 32 in the seats 28 and 29 respectively, is also formed with two depending fingers 34 and 35 which are similar in construction to the fingers 17 and 18 previously described. The fingers 34 and 35 are also square and are not tapered, so that they will fit against the square ring or flange 30 of the nipples. A nut 36 is threaded onto the bonnet 2 of the valve in the same manner previously described. To press the nipples 31 and 32 tightly against the outer faces 27 of the valve, I provide a plurality of set screws 37 in the arcuate seat 29 of the valve, which set screws extend through the seat 29 and engage the projecting flange 30 of the nipple; thus pressing the nipple tightly against the outer face of the valve. Similarly, one or more set screws 38 may extend through the fingers 34 and 35 to also engage the flanges of the nipples 31 and 32 to press the upper portion of the nipples tightly against the outer surface of the body 27 of the valve.

In Operation

In my removable nipple mounting for a ball valve, the nipples 11–12 or 31–32 can first be attached to the pipe ends. Thereafter the valve body 1 or 27 can be positioned between the inner or adjacent ends of the nipples, and positioned so that the flanges 13 or 30 of the nipples fit in the appropriate seats in the lower portion of the valve body. When this arrangement of parts has been accomplished, the valve body 1 or 27 can be rotated to a position where the control stem 3 of the valve will be readily accessible and will not interfere with adjacent objects or structures. When the valve has been properly positioned, the cap 16 is placed over the bonnet 2 of the valve, and the fingers 17–18 or 34–35 engage the annular flanges 13 or 30 of the nipples, thus securely pressing the nipples against the outer faces of the valve body to seal the nipples against the body, and also to hold them securely in position, and also to correctly hold and position the valve with relation to the aligned nipples. The nut 19 or 36, when threaded against the cap 16 or 32, will accomplish the final assembly of the parts, and will hold these parts in sealed engagement with each other.

Having described my invention, I claim:

1. In a valve including a body, said body having a chamber therein, a rotatable element in said chamber, said body having an intake port and an outlet port extending from said chamber, said rotatable element having a fluid passage extending therethrough, said fluid passage being alignable with the intake and outlet ports in one position of the parts, a nipple alignable with a port in said body, a seat on said body, a flange on said nipple adapted to fit in said seat, a cap mounted on said body, and means on the cap engageable with said flange to hold the nipple in said seat.

2. In a valve including a body, said body having a chamber therein, a rotatable element in said chamber, said body having an intake port and an outlet port extending from said chamber, said rotatable element having a fluid passage extending therethrough, said fluid passage being alignable with the intake and outlet ports in one position of the parts, a nipple alignable with a port in said body, an arcuate seat on said body, an arcuate flange on said nipple adapted to fit into said seat, a cap mounted on said body, and means on the cap engageable with said flange to hold the nipple in said seat.

3. In a valve including a body, said body having a chamber therein, a rotatable element in said chamber, said body having an intake port and an outlet port extending from said chamber, said rotatable element having a fluid passage extending therethrough, said fluid passage being alignable with the intake and outlet ports in one position of the parts, a nipple alignable with a port in said body, a seat on said body, a flange on said nipple adapted to fit into said seat, a cap positioned on the body of the valve, said cap engaging the flange on the nipple to press said flange into said seat, and a nut threaded onto the body of the valve, said nut bearing against the cap to press said cap against said flange on the nipple.

References Cited in the file of this patent
UNITED STATES PATENTS

| | | |
|---|---|---|
| 494,569 | Howell | Apr. 4, 1893 |
| 1,511,370 | Sanford | Oct. 14, 1924 |
| 2,416,787 | White | Mar. 4, 1947 |
| 2,895,496 | Sanctuary | July 21, 1959 |